United States Patent
Kakos (10) Patent No.: US 8,819,661 B2
(45) Date of Patent: Aug. 26, 2014

(54) SYSTEMS AND METHODS FOR DETERMINING TIMES TO PERFORM SOFTWARE UPDATES ON RECEIVING DEVICES

(75) Inventor: Edward A. Kakos, Lone Tree, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/305,575

(22) Filed: Nov. 28, 2011

(65) Prior Publication Data

US 2013/0139138 A1 May 30, 2013

(51) Int. Cl.
*G06F 9/44* (2006.01)
*G06F 9/445* (2006.01)

(52) U.S. Cl.
USPC ........................................ 717/168; 717/174

(58) Field of Classification Search
USPC ....................................................... 717/168
See application file for complete search history.

(56) References Cited

U.S. PATENT DOCUMENTS

| | | | | |
|---|---|---|---|---|
| 5,742,833 A * | 4/1998 | Dea et al. | | 713/323 |
| 6,108,685 A * | 8/2000 | Kutzik et al. | | 709/200 |
| 7,627,868 B2 * | 12/2009 | Addington et al. | | 717/177 |
| 7,747,982 B1 * | 6/2010 | Sie et al. | | 717/118 |
| 7,930,401 B2 * | 4/2011 | Castellucci et al. | | 709/226 |
| 7,958,505 B2 * | 6/2011 | Addington et al. | | 717/177 |
| 8,015,249 B2 * | 9/2011 | Nayak et al. | | 709/206 |
| 8,255,877 B2 * | 8/2012 | Vong et al. | | 717/126 |
| 8,321,562 B2 * | 11/2012 | Kutzik et al. | | 709/224 |
| 8,326,985 B2 * | 12/2012 | Luna et al. | | 709/224 |
| 2006/0130046 A1 * | 6/2006 | O'Neill | | 717/168 |
| 2006/0212324 A1 * | 9/2006 | Okman et al. | | 705/7 |
| 2009/0006627 A1 * | 1/2009 | Castellucci et al. | | 709/226 |
| 2009/0144557 A1 * | 6/2009 | Sutton | | 713/189 |
| 2012/0023226 A1 * | 1/2012 | Petersen et al. | | 709/224 |
| 2012/0023236 A1 * | 1/2012 | Backholm et al. | | 709/226 |
| 2012/0110173 A1 * | 5/2012 | Luna et al. | | 709/224 |
| 2012/0280830 A1 * | 11/2012 | Heath | | 340/870.02 |
| 2013/0139138 A1 * | 5/2013 | Kakos | | 717/168 |

OTHER PUBLICATIONS

Shih et al. "Wake on Wireless: An Event Driven Energy Saving Strategy for Battery Operated Devices", Proceeding MobiCom '02 Proceedings of the 8th annual international conference on Mobile computing and networking pp. 160-171 ACM New York, NY, USA © 2002 table of contents ISBN:1-58113-486-X doi.*

* cited by examiner

*Primary Examiner* — Don Wong
*Assistant Examiner* — Marina Lee
(74) *Attorney, Agent, or Firm* — Seed IP Law Group PLLC (57) ABSTRACT

A monitoring system determines when a receiving device is in stand-by mode by monitoring usage of the receiving device on a daily basis. Periodic status checks are performed (e.g., every minute) and based on these status checks, it is determined what mode the receiving device was in for each half hour (or other selected interval) of the day. The middle of the longest period of the day the receiving device was determined to be in stand-by mode is determined as a desired time of day for software updates or other automated actions to occur. This process repeats every day and these determined times of day for software updates are averaged over the number of days the usage data was collected to use as the time of day going forward (based on a moving average) for software updates or other automated actions to be performed on the receiving device.

18 Claims, 7 Drawing Sheets

SYSTEMS AND METHODS FOR DETERMINING TIMES TO PERFORM SOFTWARE UPDATES ON RECEIVING DEVICES

TECHNICAL FIELD

The technical field relates to monitoring of receiving devices, and particularly to monitoring of receiving devices to determine times for software updates.

BRIEF SUMMARY

In one embodiment, a time of day to enable or allow software updates to be made on a receiving device is determined based on a moving average over a number of days of when the receiving device is in a stand-by or other mode determined to be suitable for software updates. For each day of a plurality of days, the receiving device determines a longest period during the day in which the receiving device had been in the particular mode (e.g., a stand-by mode) determined to be suitable for software updates to be automatically made to the receiving device. The receiving device or a remote monitoring system then determines a time of day at which to enable the software updates or other automated actions to be performed on the receiving device based on these determined longest stand-by periods averaged over the plurality of days.

Whether the receiving device is in stand-by mode is determined by monitoring usage of the receiving device on a daily basis. Periodic status checks are performed (e.g., every minute) and the results are stored with corresponding timestamps on the receiving device. Based on these status checks, it is determined what mode the receiving device was in for each half hour (or other selected interval) of the day. The middle of the longest period of the day the receiving device was determined to be in stand-by mode is determined as a desired time of day for software updates or other automated actions to occur. This process repeats every day and these determined times of day for software updates are averaged over the number of days the usage data was collected to use as the time of day going forward for software updates or other automated actions to be performed on the receiving device.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
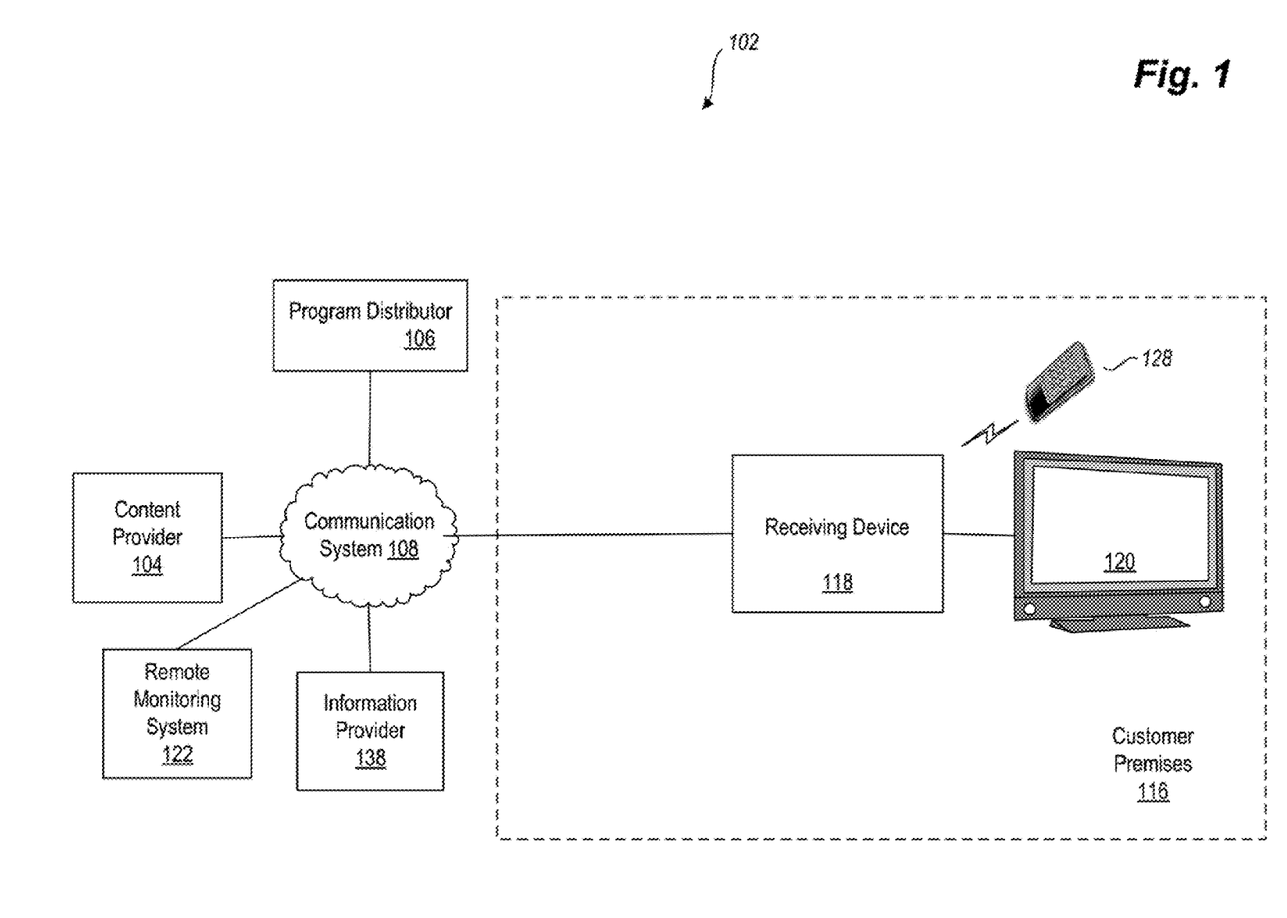
FIG. 1 is a block diagram illustrating an example content distribution environment in which embodiments of determining times to perform software updates on receiving devices may be implemented according to one example embodiment.

FIG. 1 is an overview block diagram illustrating an example content distribution environment in which embodiments of determining times to perform software updates on receiving devices may be implemented, according to one example embodiment.

Before providing additional details regarding the operation and constitution of methods and systems for determining times to perform software updates on receiving devices, the example content distribution environment 102, within which a receiving device may operate, will briefly be described.

In the content distribution environment 102, audio, video, and/or data service providers, such as, but not limited to, television service providers, provide their customers a multitude of video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, what is a receiving device 118 may include, but is not limited to, devices such as: a "television converter," "receiver," "set-top box," "television receiving device 118," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or play back programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers may include television stations which provide local or national television programming, and special content providers which provide premium based programming or pay-per-view programming.

Program content (i.e., a program), is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is ultimately communicated to the receiving device 118. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises or test facilities 116. For example, Information provider 138 may also provide information to the receiving device 118 regarding testing or configuration of the receiving device 118 as well as software updates or upgrades to the receiving device, in addition to, or instead of, such information being provided by the remote monitoring system 122.

In the illustrated example, the remote monitoring system 122 may monitor the receiving device 118 as it receives and processes the received program content. The remote monitoring system 122 may receive indications from the receiving device 118 of a mode that the receiving device 118 is in (e.g., the receiving device 118 currently displaying a screen saver or otherwise being in a stand-by mode), a channel the receiving device 118 is tuned to, an indication that a command has been sent to the receiving device 118 by a user, or that a user has otherwise interacted with the receiving device, 118, etc. The remote monitoring system 122 may also control the receiving device 118 by sending commands to the receiving device 118 to perform software updates or other configuration or maintenance operations. In some embodiments, the remote monitoring system 122 could also send commands to the receiving device 118 through a wired medium (e.g., Ethernet) to the receiving device 118.

The remote monitoring system 122 may also control the receiving device 118 by sending commands to the receiving device 118 to perform other interactive operations, such as, for example, any commands that could be entered by a user via a remote control device or other interface. The remote monitoring system 122, information provider 138 and/or the receiving device 118 may be configured to determine a particular time of day for enabling software updates received from the remote monitoring system 122 or information provider 138 to occur based on the monitoring of the receiving device 118 by the monitoring system 122, information provider 138 and/or the receiving device 118 itself.

The above description of the content distribution environment 102, the customer premises 116, and the various devices therein, is intended as a broad, non-limiting overview of an example environment in which various embodiments of determining times to perform software updates on receiving devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement determining of times to perform software updates on receiving devices. Other embodiments of the described techniques may be used for other purposes, including monitoring and updating of other receiving devices, such as audio and DVD players, digital recorders, computers, peripherals, televisions, mobile devices, telephones, and other electronic devices, and monitoring such devices to evaluate customer usage including channels viewed, length of time viewed of each channel, individual programs or events viewed, etc. In the following description, numerous specific details are set forth, such as data formats, code sequences, pseudo-code, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
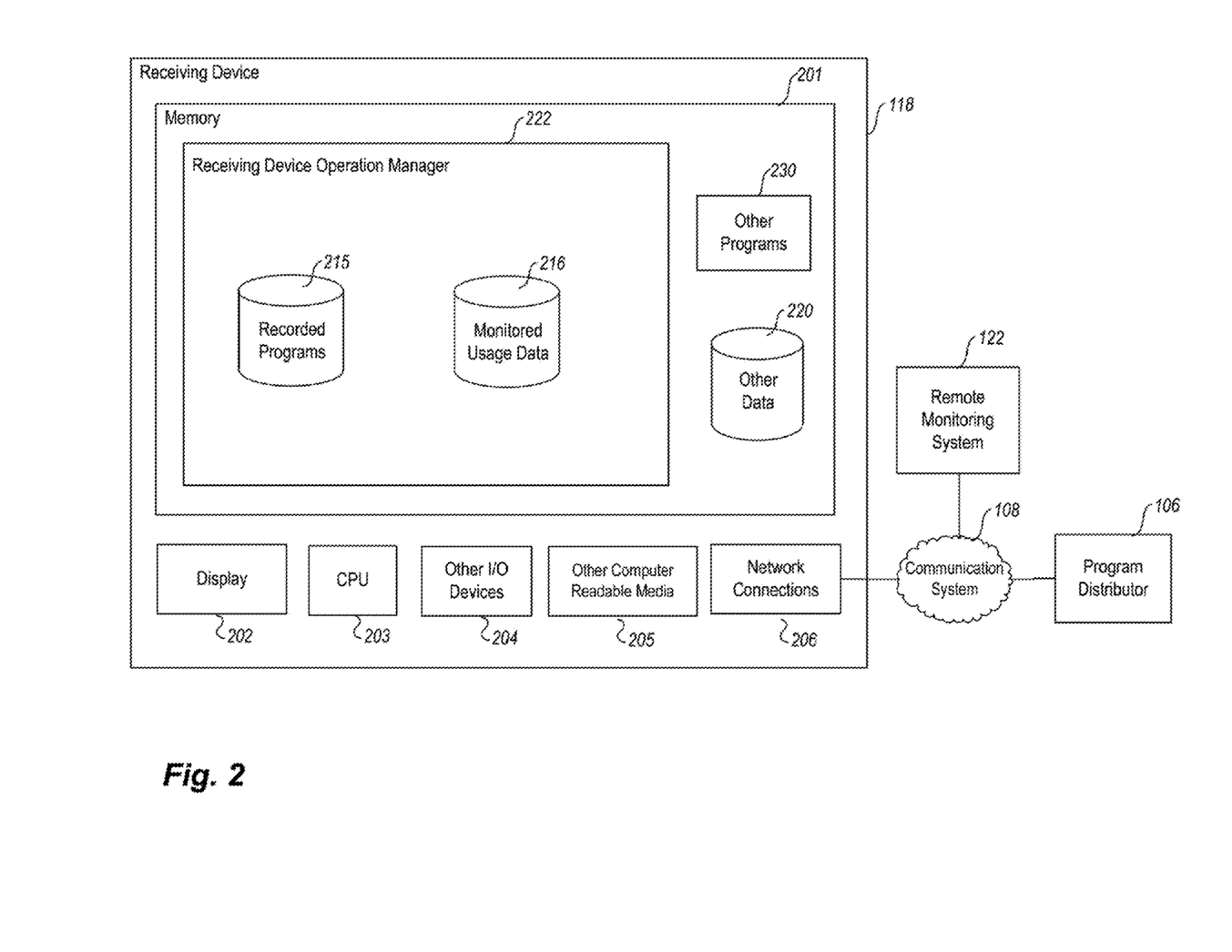
FIG. 2 is a block diagram illustrating elements of an example receiving device used in determining times to perform software updates on receiving devices according to one example embodiment.

FIG. 2 is a block diagram illustrating elements of an example receiving device used in determining times to perform software updates on receiving devices according to one example embodiment.

In one embodiment, the receiving device 118 is a set-top box configured to receive, record and display programming on a presentation device. In other embodiments, the receiving device 118 is a presentation device, such as a television or is a digital video recorder (DVR) device.

Note that one or more general purpose or special purpose computing systems/devices may be used to operate, store information regarding the receiving device 118, and communicate with the remote monitoring system 122. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device 118 operation manager 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. The receiving device 118 operation manager 222 is shown residing in memory 201. In other embodiments, some portion of the contents, some, or all, of the components of the receiving device 118 operation manager 222 may be stored on and/or transmitted over the other computer-readable media 205. The components of the receiving device 118 operation manager 222 preferably execute on one or more CPUs 203 and facilitate the receiving, decoding, processing, selecting, recording, playback and displaying of programming, as described herein. The receiving device 118 operation manager 222 also facilitates communication with peripheral devices, (e.g., the remote monitoring system 122) via the I/O devices 204 and network connections 206.

Recorded programming may reside on the recording data repository 215 and various monitored usage data of the receiving device 118 may reside on the monitored usage data repository 216. The monitored usage data may include, but is not limited to, data regarding: a current mode the receiving device 118 is in, whether the receiving device is in a stand-by mode, whether a screen saver is activated by the receiving device 118, whether a program is currently being generated for display by the receiving device 118, a current channel the receiving device 118 is tuned to, a current time, a current status of the receiving device; timestamps of previous periodic status checks of the receiving device 118, current configuration information of the receiving device, the last time the receiving device 118 was powered down, timestamps of commands received by the receiving device 118, whether the receiving device is currently receiving content or programming, a determined time of day to enable a software update to the receiving device 118, timestamps of previous software updates of the receiving device, timestamps regarding any event the receiving device had performed, length of times the receiving device had been tuned to particular channels, receiving particular content or programming and/or generating content for display.

The monitored usage data may be collected by the receiving device operation manager or other programs 230 and communicated via the network connections 206 through the communication system 108 to the remote monitoring system 122 to facilitate determining a time of day to enable software updates on the receiving device, and/or to communicate a determined time of day for software updates on the receiving device 118 to be received by and/or performed by the remote monitoring system 122 or other remote system. Thus, in some embodiments, the receiving device 118 operation manager 222 may determine the time of day to allow software updates to occur on the receiving device 118 and in other embodiments, the remote monitoring system 122 or other remote system may determine the time of day to allow software updates to occur on the receiving device 118 based on the usage data received from the receiving device 118. Also, the receiving device operation manager 222 may interact via the communication system 108 with other devices and systems such as the program distributor 106, remote monitoring system 122, or the like. For example, the other device may be a home computing system (e.g., a desktop computer, a laptop computer, etc.) that includes the functionality of the remote monitoring system 122.

Other code or programs 230 (e.g., an audio/video processing module, a program guide manager module, a Web server, and the like), and potentially other data repositories, such as data repository 220, also reside in the memory 201, and preferably execute on one or more CPUs 203. Of note, one or more of the components in FIG. 2 may not be present in any specific implementation. For example, some embodiments may not provide other computer readable media 205 or a display 202.

In some embodiments, the receiving device 118 operation manager 222 includes an application program interface ("API") that provides programmatic access to one or more functions of the receiving device operation manager 222. For example, such an API may provide a programmatic interface to one or more functions of the receiving device operation manager 118 that may be invoked by one of the other programs 230, the remote monitoring system 122, or some other module. In this manner, the API may facilitate the development of third-party software, such as user interfaces, plug-ins, adapters (e.g., for integrating functions of the receiving device 118 operation manager 222 and remote monitoring system 122 into desktop applications), and the like, to determine a time of day for enabling software updates to occur on the receiving device 118. Such software updates may be updates to the receiving device 118 operation manager 222, other programs 230, or other components of the receiving device 118.

In addition, the API may be, in at least some embodiments, invoked or otherwise accessed via the remote monitoring system 122, or remote entities, such as the program distributor 106 and the remote monitoring system 122, to access various functions of the receiving device 118 operation manager 222, including those that enable or perform software updates on the receiving device 118.

In an example embodiment, components/modules of the receiving device 118 operation manager 222 are implemented using standard programming techniques. For example, the receiving device 118 operation manager 222 may be implemented as a "native" executable running on the CPU 203, along with one or more static or dynamic libraries. In other embodiments, the receiving device 118 operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic-.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to select and present various programming or cause the receiving device to go into a stand-by mode, or other mode.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device operation manager implementation. Also, other functions could be implemented and/or performed by each component/module, and in different orders, and by different components/modules, yet still achieve the functions of the receiving device 118 operation manager 222.

In addition, programming interfaces to the data stored as part of the receiving device 118 operation manager 222 can be available by standard mechanisms such as through C, C++, C#, and Java APIs; libraries for accessing files, databases, or other data repositories; scripting languages such as XML; or Web servers, FTP servers, or other types of servers providing access to stored data. The recording data repository 215 and monitored usage data repository 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device 118 operation manager 222.

Furthermore, in some embodiments, some or all of the components of the receiving device 118 operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
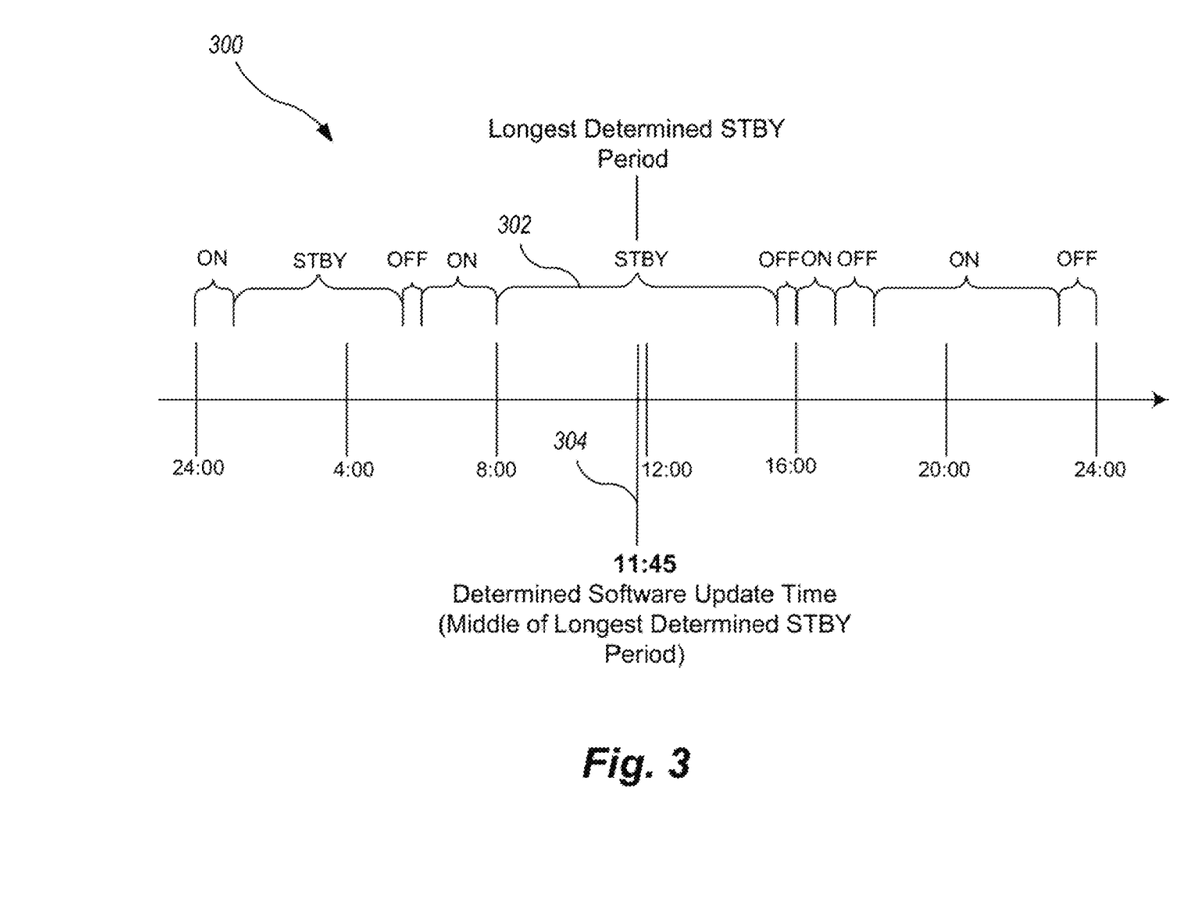
FIG. 3 is a timeline illustrating a particular time of day determined for performing a software update on the receiving device of FIG. 2, according to one example embodiment.

FIG. 3 is a timeline 300 illustrating a particular time of day determined for performing a software update on the receiving device of FIG. 2, according to one example embodiment.

Software updates to the receiving device 118 may interrupt or slow down the normal operation of the receiving device 118 such that a user may experience performance problems while viewing content using the receiving device 118 or otherwise interacting with the receiving device. This may be due to the size of the software updates, the software updating procedure, network bandwidth, processing capabilities of the receiving device 118 and/or other factors. Thus, it is desirable to schedule automatic software updates to the receiving device at times when the receiving device 118 is not being used at all or not being used to deliver content to a viewer, or at times when the receiving device has a high probability of not being used at all or not being used to deliver content to a viewer. A software update may include the downloading of software (i.e., computer programs, applications and/or instructions) to the receiving device 118 and/or the installation of such downloaded software.

In one embodiment, a time of day to schedule software updates is determined by monitoring usage patterns of the receiving device 118 and determining the longest period during one or more days the receiving device had been in a stand-by mode (i.e., "STBY"). A stand-by mode, for example, may be detected when the receiving device 118 is in a screen saver mode (i.e., either generating a screen saver image for display, or generating no image for display), or when a user has not interacted with the receiving device 118 in over a predetermined period of time. A STBY mode may also or instead be when the receiving device 118 has power being supplied to it, but the display 120 or other device for displaying content to which the receiving device is operably connected is in a power off mode, or when the receiving device 118 has power being supplied to it, but is not connected to any display device. This may be detected by the receiving device 118 being in operable communication with the connected display 120 or other device such that the receiving device receives a signal when the display 120 or other device is powered on. This may be a signal generated by the display 120 or other connected device in response to a query form the receiving device 118, or may be detected by the receiving device 118 constantly, periodically or aperiodically listening for such a signal or otherwise detecting the display 120 or other connected device being powered on or off (e.g. by receiving a signal from the remote control device of the display when the power button is selected, etc.).

Another mode is when the receiving device has no power (i.e., "OFF"). Another mode (i.e., "ON") is when the receiving device 118 is not in the OFF mode and not in the STBY mode. The ON mode is thus when a user is more likely to be using the receiving device 118, such as when the receiving device 118 is being used to deliver content to the user by generating the content for display on the presentation device 120 (shown in FIG. 1).

As shown in FIG. 3, the longest determined STBY 302 period occurred from 8:00 to 15:45 for the particular example day being monitored shown in FIG. 3. The determined software update time 304 for the receiving device 118 is determined to be in the middle of the longest determined STBY period 302 for that day. Thus, as shown in FIG. 3, it is 11:45. The determined software update time of day is determined for each day over a plurality of days (which may be contiguous). The number of days to monitor such usage may vary, (e.g., 2, 7, 10, 15, 30 days, etc.). A moving average is kept each day of these determined software update times for each day and may be used as the next scheduled time of day for a software update to the receiving device 118, should one occur. This information is stored in nonvolatile memory on the receiving device 118 and/or other remote monitoring system (e.g., remote monitoring system 122).

Figure 4:
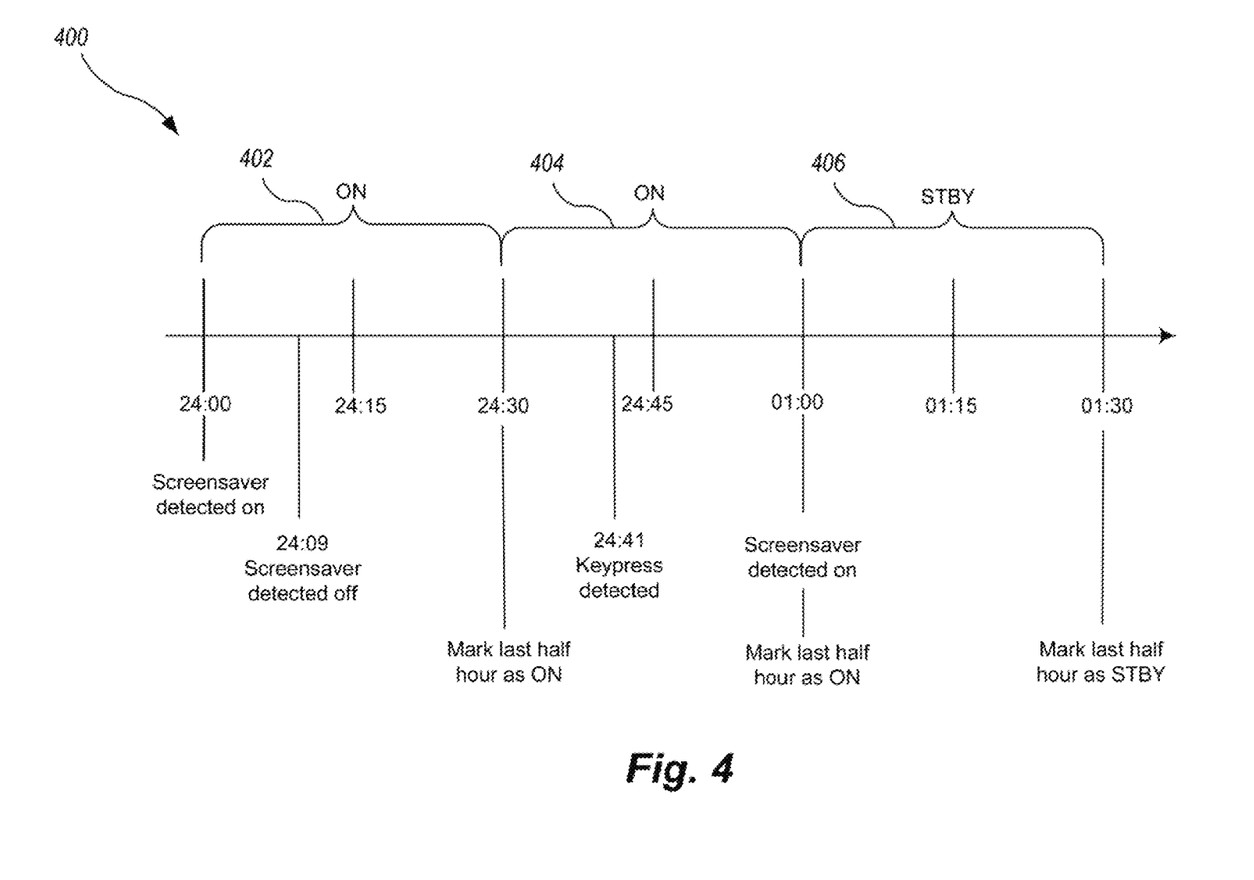
FIG. 4 is a more detailed timeline illustrating a section of the timeline of FIG. 2 showing different modes in which the receiving device of FIG. 2 was determined to be during monitoring of the receiving device to determine the particular time of day for performing a software update, according to one example embodiment.

FIG. 4 is a more detailed timeline 400 illustrating a section of the timeline 300 of FIG. 3 showing different modes in which the receiving device 118 of FIG. 2 was determined to be during monitoring of the receiving device 118.

The monitoring and determining modes of the receiving device 118 includes checking the status of the receiving device 118 every minute, on the minute, and recording the status of the receiving device 118 along with a timestamp indicating the time of day the status was recorded. However, the periodic status checks may be performed at a lower or higher frequency. The day is broken up into 48 half hour intervals. However, the length of intervals may also vary, but are longer than the intervals between the periodic status checks. After each half hour interval, the receiving device 118 or other remote monitoring system (e.g., remote monitoring system 122) determines and records a mode the receiving device 118 was in for the previous half hour that had just passed. If at any time in the past half hour the screen saver of the receiving device 118 was detected off (in cases where the receiving device 118 has a screen saver feature) or if it was detected that a user had interacted with the receiving device 118 (e.g., by performing a key press on a button or key of the receiving device 118 or remote control 128, or otherwise selecting a control on the receiving device or remote control 128), the receiving device 118 will be determined to have been in the ON mode for the entire past half hour. This is to err on the side of caution by determining the receiving device 118 had been in the ON mode for the entire past half hour to have a higher probability of avoiding a software update from occurring when a user is using the receiving device 118. This information is stored in nonvolatile memory on the receiving device 118 and/or other remote monitoring system (e.g., remote monitoring system 122).

For example, as shown in FIG. 4, at 24:30, the half hour 402 from 24:00 to 24:30 was marked and recorded as the receiving device 118 being in the ON mode since at 24:09 the screensaver was detected as being off during the periodic status check at 24:09. Similarly, at 01:00, the half hour period 404 from 24:30 to 01:00 was marked and recorded as the receiving device 118 being in the ON mode since at 24:41 a key press was detected during the periodic status check at 24:41.

As each periodic status check of the receiving device 118 is performed each minute (e.g. by using a software timer to send an interrupt to the main code of the receiving device 118), a current timestamp is recorded that is associated with the status check. At each periodic status check of the receiving device 118, the previous timestamp of the previous status check is compared to the current timestamp. If the previous timestamp is over one minute prior to the current timestamp (i.e., the minutes tracked are not contiguous) then it is determined the receiving device had been in a power down ("OFF") mode between the previous timestamp of the previous status check and the current timestamp of the current status check. This information is also stored in nonvolatile memory on the receiving device 118 and/or other remote monitoring system (e.g., remote monitoring system 122).

If the receiving device 118 had not been determined to be in the ON mode and had not been determined to have been powered down ("OFF") mode, during the past half hour, then the receiving device 118 will be determined to have been in the STBY mode for the entire past half hour. For example, this had occurred during the tracked interval 406 from 01:00 to 01:30 shown in FIG. 4. This information is stored in nonvolatile memory on the receiving device 118 and/or other remote monitoring system (e.g., remote monitoring system 122).

Figure 5:
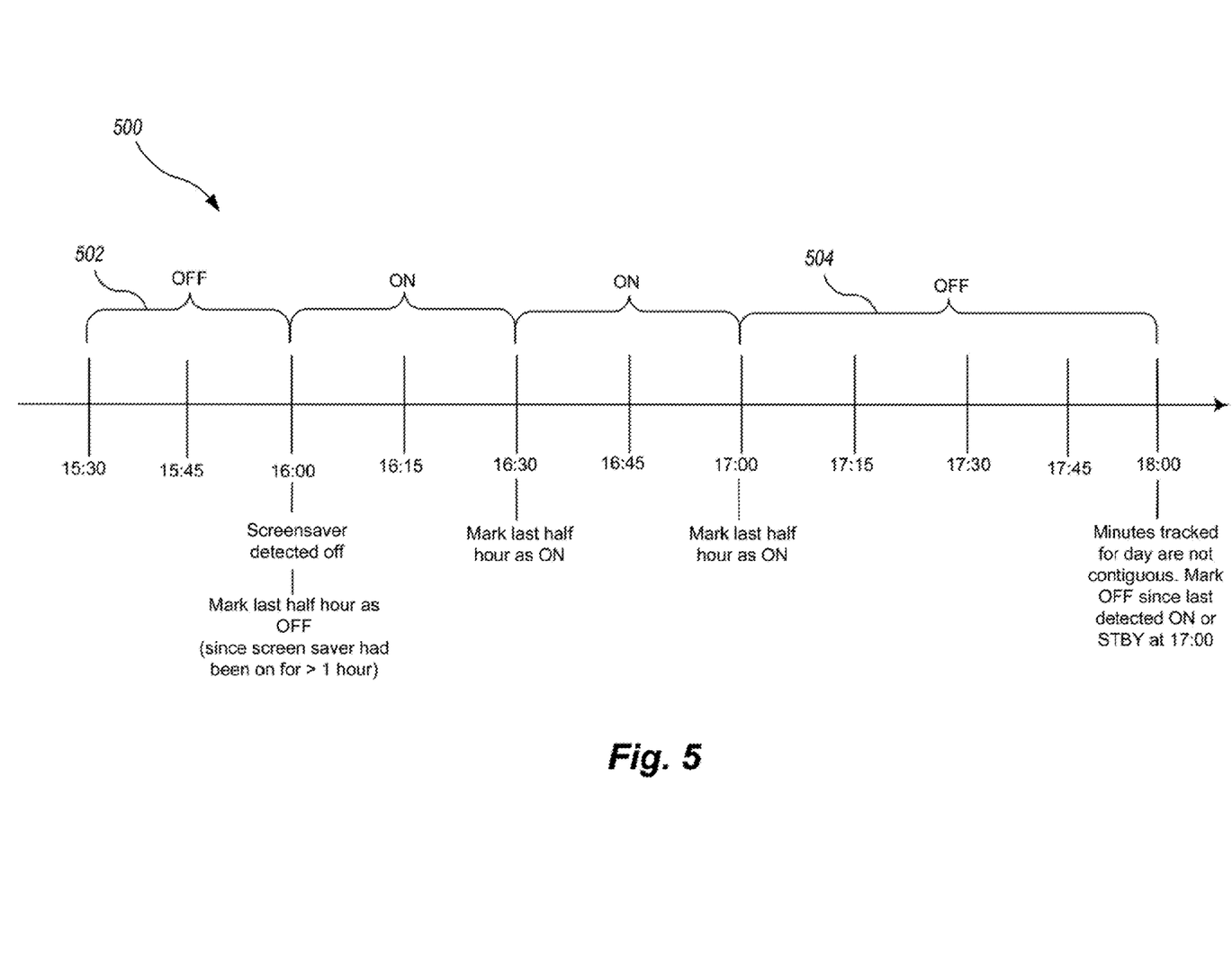
FIG. 5 is a more detailed timeline illustrating another section of the timeline of FIG. 2 showing different modes in which the receiving device of FIG. 2 was determined to be during monitoring of the receiving device to determine the particular time of day for performing a software update, according to one example embodiment.

FIG. 5 is a more detailed timeline 500 illustrating another section of the timeline 300 of FIG. 3 showing different modes in which the receiving device 118 of FIG. 2 was determined to be during monitoring of the receiving device 118.

In one embodiment, if the screensaver of the receiving device 118 had been detected to be on for more than one hour, then the last half hour of the entire time the screensaver of the receiving device 118 had been detected to be on is instead recorded as the receiving device 118 having been in the OFF mode. This is also to ensure a higher probability of avoiding a software update from occurring when the receiving device 118 is not in STBY mode when using this monitored usage of the receiving device 118 to determine a time of day for the software update to occur going forward. This is shown in FIG. 5 wherein the half hour period 502 from 15:30 to 16:00 was determined to be an OFF mode for the receiving device 118 since at 16:00 the screen saver had been detected to be turned off, but had been detected to be on for more than one hour (i.e., from 8:00 to 16:00, as shown in FIG. 4) prior to turning off at 16:00. This information is stored in nonvolatile memory on the receiving device 118 and/or other remote monitoring system (e.g., remote monitoring system 122).

As shown in FIG. 5, at 18:00, the periodic status check of the receiving device 118 revealed the previous timestamp (17:00) was over one minute previous to the current timestamp (18:00). Thus, the minutes tracked for the receiving device 118 were not contiguous and it was determined the receiving device 118 had been in a power down (OFF) mode for the interval 504 between the previous timestamp of the previous status check (17:00) and the current timestamp of the current status check (18:00). This information is also stored in nonvolatile memory on the receiving device 118 and/or other remote monitoring system (e.g., remote monitoring system 122).

When a receiving device 118 is first started by a new user, a default software update time of day is set at 03:00. However, other software update times of day may be used instead, such as those in which receiving devices are usually, or have a higher probability of being, in a stand-by mode. Usage data of the receiving device 118 as described above then begins to be collected and the receiving device mode determination then begins upon the first half hour interval after start-up (i.e., boot up) of the receiving device. The receiving device may then determine a different time of day than the initial default time of day at which to enable the software updates to be made on the receiving device 118 based on the usage patterns as described above.

If the determined different time of day is not greater than the previously determined or default time of day by a predetermined percentage, then the receiving device 118 updates the previously determined or default time of day at which to enable the software updates to be the newly determined different time of day. If the determined different time of day is greater than the previously determined or default time of day by a predetermined percentage, then the receiving device 118 leaves the default time of day as the time of day at which to enable the software updates or updates the previously determined time of day to be the default time of day at which to enable the software updates. This accounts for either a change of customer or a change in the existing customer's viewing habits.

Below is a listing of pseudo-code explaining a way of implementing and automating the corresponding procedures described herein for determining times to perform software updates on receiving devices, according to one example embodiment:

```
PSEUDO CODE -
Variables:
Minutes - Variable showing the number of minutes at any given time.
BoxON - Box is ON. Customer is viewing content.
BoxOFF - Box is unplugged. No download can occur at this time.
BoxSTANDBY - Box is powered up, but not being viewed. Download occurs
at this time.
ScreenSaverON - Screensaver is initiated.
KeyPressON - Customer has pressed any key on the remote or the box's
front panel.
Block - A half hour interval of time.
BlockBeginTime - Real-time clock setting at the beginning of any
block.
BlockEndTime - Real-time clock setting at the end of any block.
Note that for any two contiguous blocks, the BlockEndTime of Block N
is equal to the
BlockBeginTime of Block N+1.
Every minute, a software timer will send an interrupt to the main
code. This interrupt will initiate a function called ON-OFF-STANDBY
DETERMINATION.
****************************************
ON-OFF-STANDBY DETERMINATION
****************************************
IF (Minutes are contiguous)      // Minutes must occur incremented by
one.
    IF (ScreenSaverON OR KeyPressON) // Box is powered ON but not
being viewed.
        THEN (increment BoxStandBy AND clear BoxOFF AND clear BoxON)
        Record BlockBeginTime AND BlockEndTime
    ELSE // Box is powered ON and is being viewed)
        THEN (increment BoxON AND clear BoxOFF AND clear BoxStandBy)
        Record BlockBeginTime AND BlockEndTime
ELSE (Minutes are not contiguous) // Box has been unplugged.
    THEN get last BoxOFF time and ADD to current time) // This is the
time the box was unplugged.
IF (Minutes = 30) // Every 30 minutes, add the current status to the
preceeding block if identical.
        ADD Block number of current ON/OFF/STANDBY status to any
identical preceeding block.
    IF (Block not identical)
        Record current Block starting at 0.
****************************************
DETERMINED DOWNLOAD TIME (DDT)
****************************************
IF (Blocks = 48)     // One day has gone by
    LargestStandbyTime = LargestNumberContiguousStandbyBlocks
IF (Minutes are contiguous)      // Minutes must occur incremented by
one.
    IF (ScreenSaverON OR KeyPressON) // Box is powered ON but not
being viewed.
        THEN (increment BoxStandBy AND clear BoxOFF AND clear BoxON)
        Record BlockBeginTime AND BlockEndTime
    ELSE // Box is powered ON and is being viewed)
        THEN (increment BoxON AND clear BoxOFF AND clear BoxStandBy)
        Record BlockBeginTime AND BlockEndTime
ELSE (Minutes are not contiguous) // Box has been unplugged.
DeterminedDownloadTime = (LargestStandbyBeginTime +
LargestStandbyEndTime)/2
// This sets the optimal download time in the middle of the largest
number of STANDBY blocks.
AverageOptimalDownloadTime = Sum of all DDT for N days/N days
```

Figure 6:
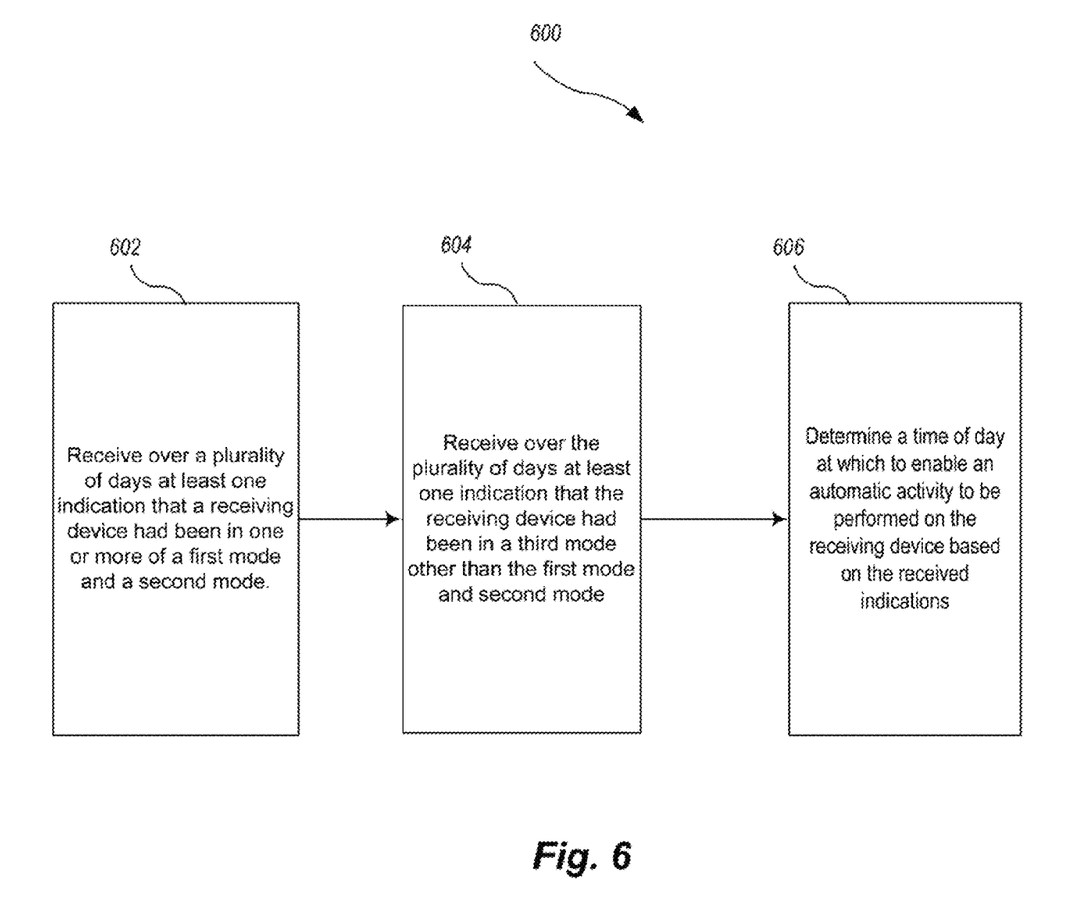
FIG. 6 is a flow diagram of a method of determining times to perform software updates on receiving devices, according to one example embodiment.

FIG. 6 is a flow diagram of a method 600 of determining times to perform software updates on receiving devices, according to one example embodiment.

At 602, the receiving device 118 or remote monitoring system 122 receives, over a plurality of days, at least one indication that a receiving device had been in one or more of a first mode and a second mode. For example, the first mode may be a mode in which the receiving device 118 is generating program content or a program guide for display, and the second mode is a mode in which the receiving device 118 has no power. Both these modes are thus not modes in which it is desirable to perform a software update on the receiving device 118 because it is likely a user is viewing a program or otherwise using the receiving device 118, or the receiving device is powered off and cannot perform a software update.

On the other hand, the third mode may be at least one of: a mode in which the receiving device is in a screen saver mode; a mode in which, over a specified period, a user had not interacted with the receiving device; and a mode in which the receiving device has power being supplied to the receiving device, but no display to which the receiving device is connected is powered on. Thus, the third mode is a mode in which it is desirable to perform a software update on the receiving device 118 because it is less likely a user is viewing a program or otherwise using the receiving device 118, but the receiving device is powered on to enable the update or other automatic activity. However, in some embodiments, the receiving device 118 may be scheduled to be powered on or be remotely powered on in order to perform a function such as a software update, and then be powered off after the update is complete.

At 604, the receiving device 118 or remote monitoring system 122 receives, over the plurality of days, at least one indication that the receiving device had been in a third mode other than the first mode and second mode (e.g., a stand-by mode).

At 606, the receiving device 118 or remote monitoring system 122 determines a time of day at which to enable an automatic activity to be performed on the receiving device 118 based on the received indications. For example, the determination may be based on at least one indication that the receiving device had been in one or more of a first mode and a second mode and based on the received indication that the receiving device had been in the third mode.

This automatic activity to be performed by or on the receiving device 118 may include, but is not limited to: software uploads, downloads, installations, updates and/or upgrades; configuration of the receiving device 118; maintenance procedures for the receiving device 118; testing of the receiving device 118; downloading or uploading programming content, user profiles, preferences, advertisements, web pages, promotions, and/or electronic program guides; receiving or sending data, etc. Such may be enabled by the receiving device 118 setting a flag in memory or scheduling a specific time in memory to allow such actions to occur, or by receiving from the remote monitoring system 122 authorization or a command to allow such actions to occur.

Figure 7:
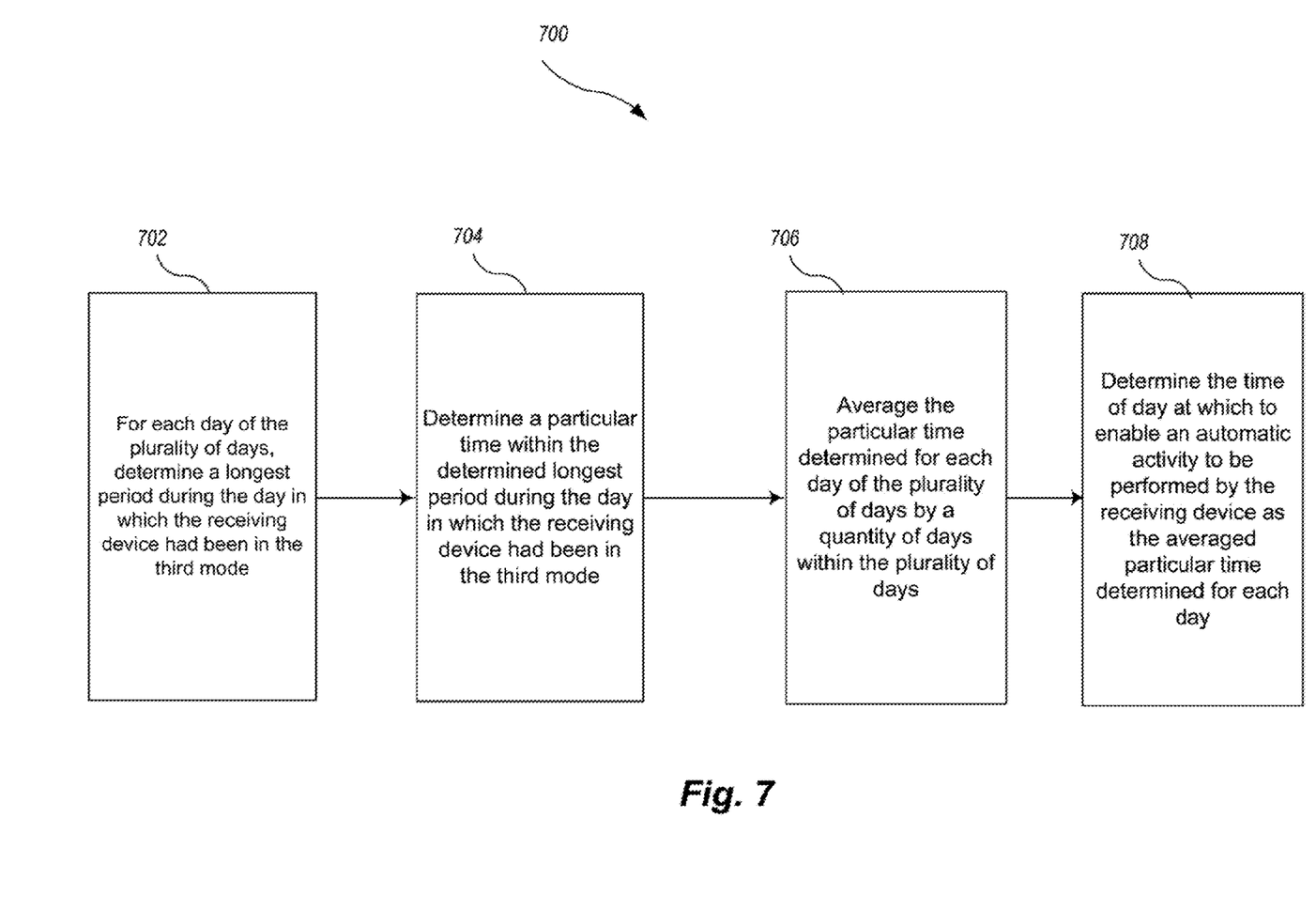
FIG. 7 is a flow diagram of a method of the determining portion of the determining times to perform software updates on receiving devices method shown in FIG. 6, according to one example embodiment.

FIG. 7 is a flow diagram of a method 700 of the determining portion of the method 600 shown in FIG. 6, according to one example embodiment.

At 702, the receiving device 118 or remote monitoring system 122, for each day of the plurality of days, determines a longest period during the day in which the receiving device had been in the third mode.

At 704, the receiving device 118 or remote monitoring system 122 determines a particular time within the determined longest period during the day in which the receiving device had been in the third mode.

At 706, the receiving device 118 or remote monitoring system 122 averages the particular time determined for each day of the plurality of days by a quantity of days within the plurality of days.

At 708, the receiving device 118 or remote monitoring system 122 determines the time of day at which to enable an automatic activity to be performed by the receiving device 118 as the averaged particular time determined for each day. This may be a moving average for a plurality of previous days. The plurality of previous days used may vary and an update of the determined time of day at which to enable the automatic activity to be performed on the receiving device 118 need not be updated every day based on the new moving average for the current day, but may be updated after a determined number of days or weeks (e.g., 2, 7, 10, 14, 30 days, etc.).

While various embodiments have been described hereinabove, it is to be appreciated that various changes in form and detail may be made without departing from the spirit and scope of the invention(s) presently or hereafter claimed.

The invention claimed is:

1. A computer-implemented method comprising:
receiving, over a plurality of days, at least one indication that a receiving device had been in one or more of a first mode and a second mode, wherein the first mode is a mode in which the receiving device is generating program content or a program guide for display, and wherein the second mode is a mode in which the receiving device has no power;
receiving over the plurality of days at least one indication that the receiving device had been in a third mode other than the first mode and second mode, wherein the third mode is at least one of: a mode in which the receiving device is in a screen saver mode; a mode in which, over a specified period, a user had not interacted with the receiving device; and a mode in which the receiving device has power being supplied to the receiving device, but no display to which the receiving device is connected is powered on; and
determining a time of day at which to enable an automatic activity to be performed on the receiving device based on the received at least one indication that the receiving device had been one or more of a first mode and a second mode and the received at least one indication that the receiving device had been in the third mode, the determining including:
for each day of the plurality of days:
determining a longest period during the day in which the receiving device had been in the third mode;
determining a particular time within the determined longest period during the day in which the receiving device had been in the third mode;
averaging the particular time determined for each day of the plurality of days by a quantity of days within the plurality of days; and
determining the time of day at which to enable the automatic activity based on the averaged particular time determined.

2. The method of claim 1, further comprising determining the particular time within the determined longest period as being in a middle of the longest period.

3. The method of claim 1, wherein the receiving at least one indication that the receiving device had been in one or more of the first mode and the second mode includes:
receiving at least one of: an indication that, over a period of time, the receiving device had at one or more points ceased being in a screen saver mode; an indication that, over the period of time, a user had at one or more points interacted with the receiving device; and an indication that the receiving device had not had power during at least some point within the period of time.

4. The method of claim 3, wherein the period of time is one half hour.

5. The method of claim 3, wherein the indication that the user had interacted with the receiving device is an indication that the user had selected a control on the receiving device or on a remote control of the receiving device.

6. The method of claim 1, wherein the receiving at least one indication that the receiving device had been in the third mode includes receiving at least one of: an indication that the receiving device had not ceased being in a screen saver mode over a period of time, an indication that a user had not interacted with the receiving device over the period of time, and an indication that no display to which the receiving device was connected was powered on over the period of time.

7. The method of claim 6, wherein the receiving at least one indication that the receiving device had been in the third mode further includes automatically periodically checking a status of the receiving device during the period of time.

8. The method of claim 1, wherein the automatic activity is updating software of the receiving device.

9. The method of claim 1, wherein the automatic activity is maintenance of the receiving device.

10. The method of claim 1, wherein the automatic activity is at least one of: testing of the receiving device and obtaining data from the receiving device.

11. The method of claim 1, wherein the receiving at least one indication that the receiving device had been in one or more of a first mode and a second mode, the receiving at least one indication that the receiving device had been in a third mode, and the determining a time of day at which to enable an automatic activity to be performed by the receiving device are performed by a monitoring system located remotely from the receiving device.

12. The method of claim 1, wherein the receiving at least one indication that the receiving device had been in one or more of a first mode and a second mode, the receiving at least one indication that the receiving device had been in a third mode, and the determining a time of day at which to enable an automatic activity to be performed by the receiving device are performed by the receiving device.

13. A system comprising:
at least one processor;
a memory coupled to the at least one processor, wherein the at least one processor is configured to:
receive, over a plurality of days, at least one indication that a receiving device had been in one or more of a first mode and a second mode, wherein the first mode is a mode in which the receiving device is generating program content or a program guide for display, and wherein the second mode is a mode in which the receiving device has no power;
receive over the plurality of days at least one indication that the receiving device had been in a third mode other than the first mode and second mode, wherein the third mode is at least one of: a mode in which the receiving device is in a screen saver mode; a mode in which, over a specified period, a user had not interacted with the receiving device; and a mode in which the receiving device has power being supplied to the receiving device, but no display to which the receiving device is connected is powered on; and
determine a time of day at which to enable software updates to be performed on the receiving device based on the received at least one indication that the receiving device had been one or more of a first mode and a second mode and the received at least one indication that the receiving device had been in the third mode, the at least one processor being configured to determine the time of day at which to enable software updates to be performed by at least being configured to:
for each day of a first plurality of days, determine a longest period during the day in which the receiving device had been in the third mode;
determine a particular time within the determined longest period during the day in which the receiving device had been in the third mode;
average the particular time determined for each day of the plurality of days by a quantity of days within the first plurality of days; and
determine the time of day at which to enable the software updates to be made on the receiving device based on the averaged particular time determined.

14. The system of claim 13, wherein the first plurality of days is a contiguous plurality of days.

15. The system of claim 13, wherein the at least one processor is further configured to:
for each of a second plurality of days:
determine a longest period during the day in which the receiving device had been in a particular mode; and
determine a different time of day at which to enable the software updates to be made on the receiving device based on the determined longest period for each day of the second plurality of days; and
update the determined time of day at which to enable the software updates based on the determined different time of day at which to enable the software updates to be made on the receiving device.

16. The system of claim 15, wherein the at least one processor is further configured to:
if the determined different time of day is not greater than the determined time of day by a predetermined percentage, then update the determined time of day at which to enable the software updates to be the determined different time of day; and
if the determined different time of day is greater than the determined time of day by the predetermined percentage, then update the determined time of day at which to enable the software updates to be a predetermined default time of day.

17. A non-transitory computer-readable storage medium having computer executable instructions thereon, that when executed by a computer processor, cause the following method to be performed:
receiving over a plurality of days at least one indication that a receiving device had been in one or more of a first mode and a second mode, wherein the first mode is a mode in which the receiving device is generating program content or a program guide for display, and wherein the second mode is a mode in which the receiving device has no power;
receiving over the plurality of days at least one indication that the receiving device had been in a third mode other than the first mode and second mode, wherein the third mode is at least one of: a mode in which the receiving device is in a screen saver mode; a mode in which, over a specified period, a user had not interacted with the receiving device; and a mode in which the receiving device has power being supplied to the receiving device, but no display to which the receiving device is connected is powered on; and
determining a time of day at which to enable an automatic activity to be performed on the receiving device based on the received at least one indication that the receiving device had been one or more of a first mode and a second mode and the received at least one indication that the receiving device had been in the third mode, the determining including:
for each day of the plurality of days:
determining a longest period during the day in which the receiving device had been in the third mode;
determining a particular time within the determined longest period during the day in which the receiving device had been in the third mode;
averaging the particular time determined for each day of the plurality of days by a quantity of days within the plurality of days; and
determining the time of day at which to enable the automatic activity based on the averaged particular time determined.

18. The non-transitory computer-readable storage medium of claim 17 wherein the first mode is a mode in which the receiving device is generating program content and tuned to a particular channel.

* * * * *